United States Patent
Orii

(10) Patent No.: US 11,312,186 B2
(45) Date of Patent: Apr. 26, 2022

(54) PNEUMATIC TIRE

(71) Applicant: Toyo Tire Corporation, Itami (JP)

(72) Inventor: Keiki Orii, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 124 days.

(21) Appl. No.: 16/680,608

(22) Filed: Nov. 12, 2019

(65) Prior Publication Data
US 2020/0156415 A1  May 21, 2020

(30) Foreign Application Priority Data

Nov. 16, 2018  (JP) .............................. JP2018/215795

(51) Int. Cl.
*B60C 11/13* (2006.01)
*B60C 11/04* (2006.01)
*B60C 11/03* (2006.01)

(52) U.S. Cl.
CPC ........ *B60C 11/047* (2013.01); *B60C 11/1353* (2013.01); *B60C 2011/0341* (2013.01); *B60C 2011/0355* (2013.01); *B60C 2011/0358* (2013.01); *B60C 2011/0365* (2013.01); *B60C 2011/1361* (2013.01)

(58) Field of Classification Search
CPC ......... B60C 11/1353; B60C 2011/0358; B60C 2011/0365; B60C 2011/1361
See application file for complete search history.

(56) References Cited

U.S. PATENT DOCUMENTS

2005/0103416 A1*  5/2005  Rooney ............... B60C 11/0316
                                                      152/209.16
2008/0047642 A1*  2/2008  Ohara ................. B60C 11/0316
                                                      152/209.15

FOREIGN PATENT DOCUMENTS

| CN | 101130330 A |   | 2/2008  |              |
|----|-------------|---|---------|--------------|
| CN | 104401190 A | * | 3/2015  |              |
| FR | 1163341 A   | * | 9/1958  | ......... B60C 11/0309 |
| JP | 2003154812 A| * | 5/2003  |              |
| JP | 2005053257 A| * | 3/2005  | ......... B60C 11/1369 |
| JP | 2010260395 A| * | 11/2010 |              |
| JP | 2012-35684 A|   | 2/2012  |              |

OTHER PUBLICATIONS

Ogawa, JP-2010260395-A Machine Translation (Year: 2010).*
Luo, CN-104401190-A Machine Translation (Year: 2015).*

(Continued)

*Primary Examiner* — Steven D Maki
(74) *Attorney, Agent, or Firm* — WHDA, LLP

(57) ABSTRACT

A pneumatic tire includes a lateral groove that includes a groove bottom surface extending in a direction crossing a tire circumferential direction, and a protrusion provided on the groove bottom surface and extending in an extension direction of the groove bottom surface. The protrusion includes a main body, and an end portion provided on at least one side in a longitudinal direction of the main body and shaped such that a height of the protrusion from the groove bottom surface decreases from an inside to an outside in the longitudinal direction of the main body. The end portion includes an upper surface that forms a circular arc recessed inward in a tire radial direction in a cross section crossing a width direction of the protrusion.

4 Claims, 7 Drawing Sheets

(56) References Cited

OTHER PUBLICATIONS

Ohashi, JP-2003154812-A Machine Translation (Year: 2003).*
Office Action dated Jul. 21, 2021, issued in counterpart CN application No. 201911097843.7, with the English machine translation. (18 pages).

* cited by examiner

PNEUMATIC TIRE

CROSS-REFERENCE TO RELATED APPLICATIONS

This application claims priority of Japanese Patent Application No. 2018-215795 filed on Nov. 16, 2018, the content of which is incorporated herein by reference.

BACKGROUND OF THE INVENTION

Technical Field

The present invention relates to a pneumatic tire.

Related Art

A pneumatic tire which includes protrusions (e.g., stone ejectors) on groove bottoms of grooves formed in a tread portion is known. JP 2012-35684 A discloses a pneumatic tire which includes a plurality of grooves disposed in a tread portion. The plurality of grooves extend in a tire circumferential direction and a tire width direction. Protrusions are provided on groove bottoms of the plurality of grooves. Heights of the protrusions vary in a longitudinal direction of the grooves.

SUMMARY

During vulcanization molding of the pneumatic tire having the protrusions described above, a defective flow of rubber may occur in recesses provided in a mold for molding the protrusions. In this case, dents (bareness) may be produced in a surface of the protrusions of the pneumatic tire after vulcanization molding.

An object of the present invention is to provide a pneumatic tire capable of reducing bareness.

One aspect of the present invention provides a pneumatic tire including: a lateral groove that includes a groove bottom surface extending in a direction crossing a tire circumferential direction; and a protrusion provided on the groove bottom surface and extending in an extension direction of the groove bottom surface. The protrusion includes a main body, and an end portion provided on at least one side in a longitudinal direction of the main body, and shaped such that a height of the protrusion from the groove bottom surface decreases from an inside to an outside in the longitudinal direction of the main body. The end portion includes an upper surface that forms a circular arc recessed inward in a tire radial direction in a cross section crossing a width direction of the protrusion.

According to this configuration, the upper surface of the end portion of the protrusion is shaped such that the height of the upper surface from the groove bottom surface decreases toward the outside in the longitudinal direction of the protrusion. Accordingly, the recess of the mold corresponding to the protrusion becomes deeper from the outside to the inside in the longitudinal direction of the recess in the portion corresponding to the end portion of the protrusion. In this case, rubber is guided along the portion of the recess corresponding to the end portion of the protrusion during vulcanization molding. Accordingly, the rubber easily flows to a deepest portion of the recess while reducing a defective flow of rubber. Reduction of bareness is thus achievable.

The end portion may widen from the inside to the outside in a longitudinal direction of the protrusion in a plan view.

According to this configuration, the end portion of the protrusion widens from the inside to the outside in the longitudinal direction of the protrusion in the plan view. Accordingly, an opening width of the recess of the mold corresponding to the protrusion increases from the inside to the outside in the longitudinal direction of the protrusion in the portion corresponding to the end portion of the protrusion. Accordingly, the rubber easily flows to the recess while reducing a defective flow of rubber during vulcanization molding. Reduction of bareness is thus achievable.

The end portion may include a side surface that forms a circular arc recessed inward in a width direction of the end portion in a plan view.

According to this configuration, the side surface of the end portion forms the circular arc recessed inward in the width direction of the end portion in the plan view. Accordingly, the recess of the mold corresponding to the protrusion is shaped such that the opening width gradually increases from the inside to the outside in the longitudinal direction of the protrusion in the portion corresponding to the end portion of the protrusion. In this case, rubber is guided along the portion of the recess corresponding to the end portion of the protrusion during vulcanization molding. Accordingly, the rubber easily flows to a deepest portion of the recess while reducing a defective flow of rubber. Reduction of bareness is thus achievable.

It is preferable that a longitudinal groove that extends in the tire circumferential direction and communicates with the lateral groove be further provided, and that the main body of the protrusion does not reach the longitudinal groove.

According to this configuration, the main body of the protrusion is disposed inside the lateral groove, and the main body of the protrusion does not block a flow path in the longitudinal groove. Accordingly, sufficient drainage performance of the longitudinal groove can be obtained.

The upper surface of the end portion may be connected to the groove bottom surface in a tangential continuous manner.

According to this configuration, the upper surface of the end portion is connected to the groove bottom surface in a tangential continuous manner. Accordingly, the recess of the mold corresponding to the protrusion is smoothly connected from the portion of the mold corresponding to the groove bottom surface of the lateral groove in the portion corresponding to the end portion of the protrusion. In this case, rubber is guided along the portion of the recess corresponding to the end portion of the protrusion during vulcanization molding. Accordingly, the rubber easily flows to a portion of the recess while reducing a defective flow of rubber. Reduction of bareness is thus achievable.

The lateral groove may include a pair of groove side walls that rise outward in the tire radial direction from both ends of the groove bottom surface in the width direction of the groove bottom surface. The end portion may be separated from the pair of groove side walls in a plan view.

According to this configuration, the end portion is separated from the groove side walls, and the protrusion does not block a flow path of the lateral groove. Accordingly, sufficient drainage performance of the lateral groove can be obtained.

One groove side wall of the pair of groove side walls may include an inclined portion inclined such that a width of the lateral groove increases from the inside to the outside in a longitudinal direction of the lateral groove in a plan view. The end portion may include a side surface that extends along the inclined portion of the one groove side wall in a plan view.

According to the present invention, reduction of bareness is achievable.

BRIEF DESCRIPTION OF THE DRAWINGS

The foregoing and the other features of the present invention will become apparent from the following description and drawings of an illustrative embodiment of the invention in which.

DETAILED DESCRIPTION OF EMBODIMENTS

An embodiment according to the present invention is hereinafter described with reference to the accompanying drawings. It should be noted that the following description is essentially presented by way of example, and not intended to limit the present invention, applicable ranges of the present invention, or purposes of use of the present invention. In addition, the accompanying drawings are only schematic figures, and do not show actual ratios or the like of respective dimensions. In the figures, a tire circumferential direction is expressed as TC, a tire width direction is expressed as TW, and a tire radial direction is expressed as TR depending on circumstances.

First Embodiment

Figure 1:
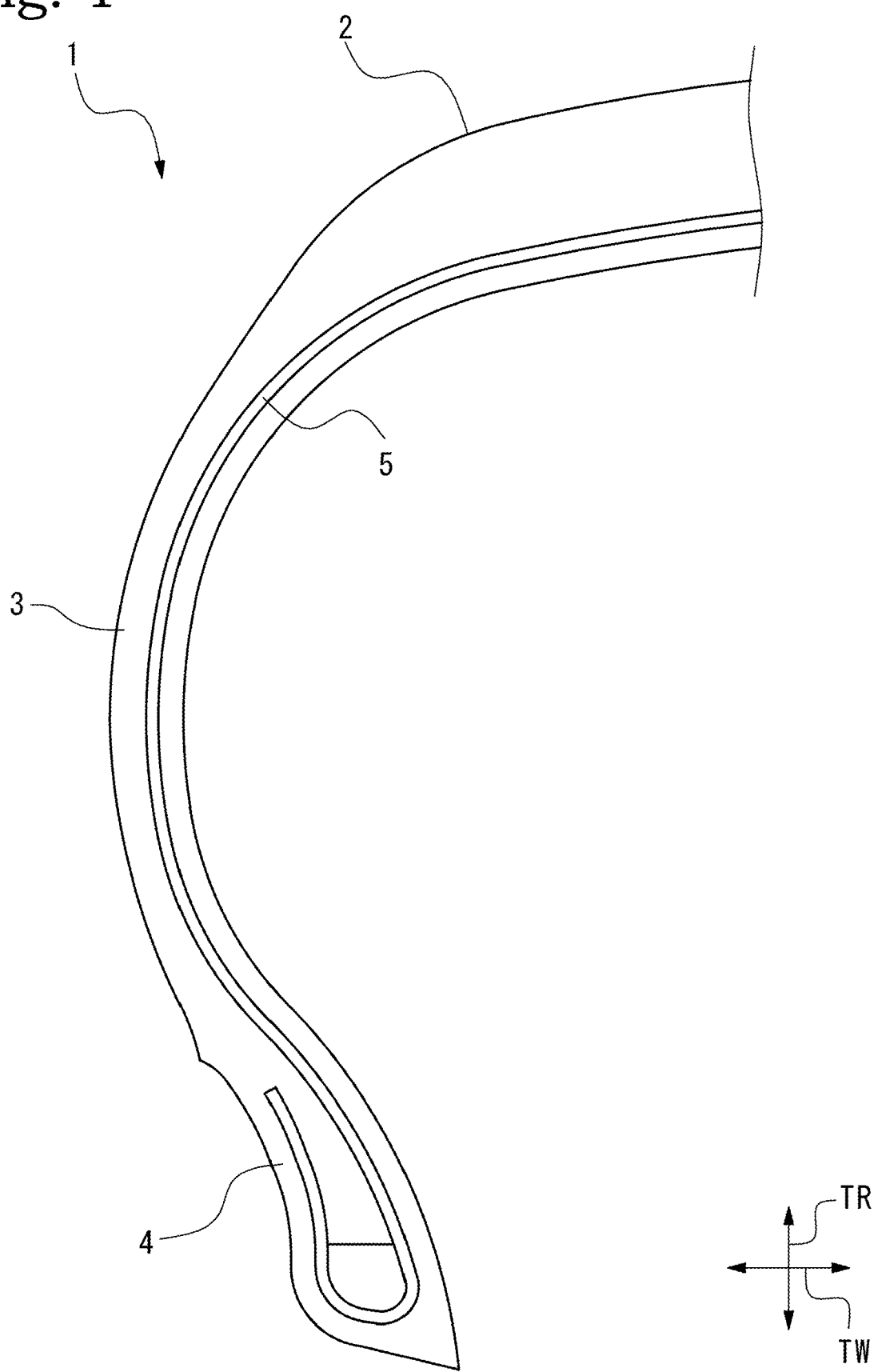
FIG. 1 is a cross-sectional view of a pneumatic tire in a meridian direction according to a first embodiment of the present invention.

FIG. 1 is a cross-sectional view of a pneumatic tire in a meridian direction according to the present embodiment.

Referring to FIG. 1, a pneumatic tire 1 includes a tread portion 2, a sidewall portion 3, and a pair of bead portions 4. The sidewall portions 3 extend from both end portions of the tread portions 2 in the tire width direction TW while curving toward the inside in the tire radial direction TR. Each of the bead portions 4 is provided at an inner end of the corresponding sidewall portion 3 in the tire radial direction TR. A carcass layer 5 having a toroidal shape is extended between the pair of bead portions 4 inside the pneumatic tire 1. The accompanying drawing does not show internal structures except for the carcass layer 5.

Figure 2:
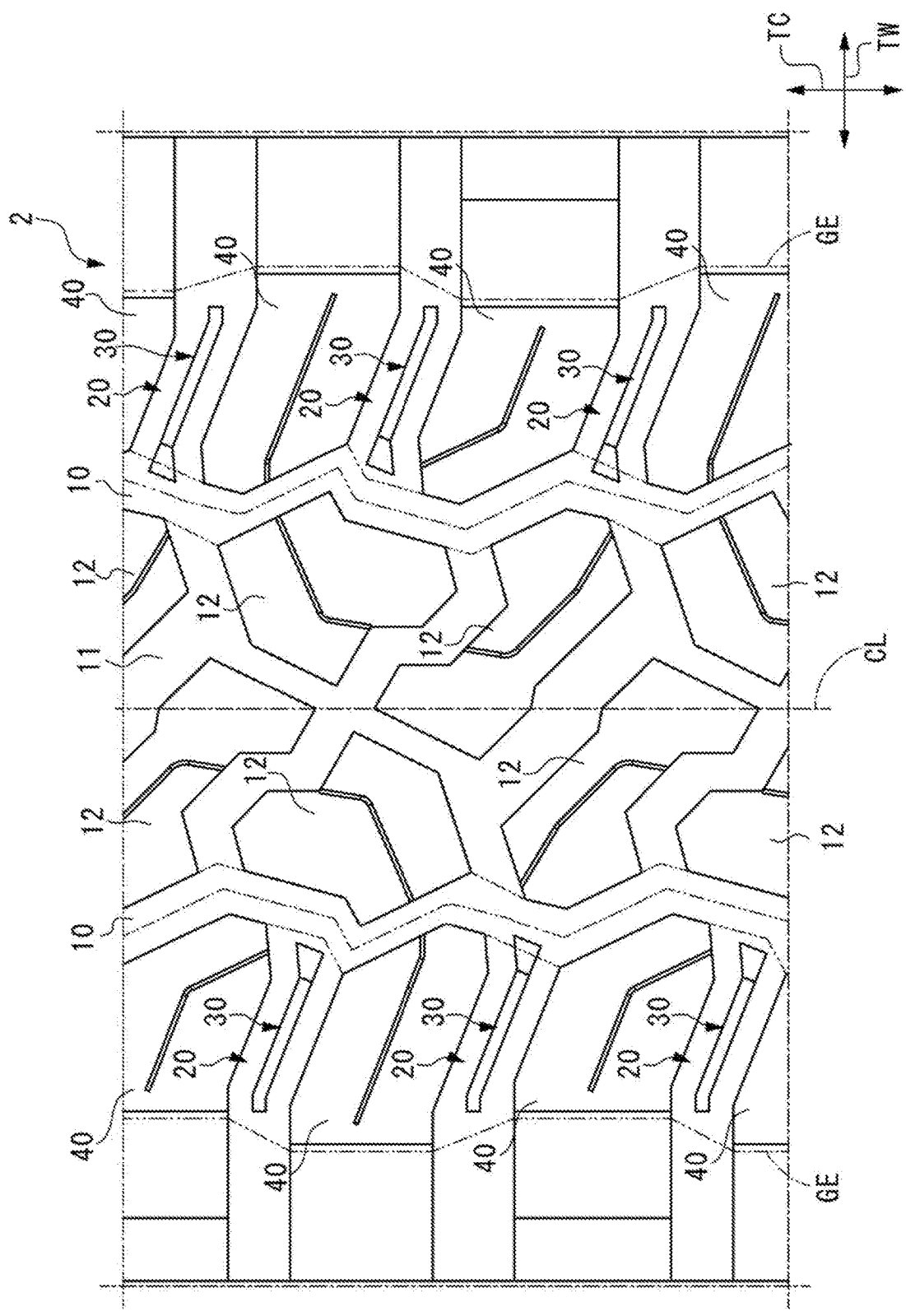
FIG. 2 is a development view showing a tread pattern of a tread portion of the pneumatic tire according to the first embodiment.

FIG. 2 is a development view showing a tread pattern of the tread portion 2 of the pneumatic tire 1 according to the present embodiment. FIG. 2 shows only a part of the tread pattern of the pneumatic tire 1 in the tire circumferential direction TC.

Referring to FIG. 2, the tread portion 2 of the pneumatic tire 1 of the present embodiment includes two longitudinal grooves 10 extending in the tire circumferential direction TC. In the present embodiment, the longitudinal grooves 10 are respectively provided on both sides in the tire width direction TW with respect to a center line CL in the tire width direction TW. The longitudinal grooves 10 of the present embodiment extend in a zigzag line in the tire circumferential direction TC. The longitudinal groove 10 may linearly extend in the tire circumferential direction TC.

A tread groove 11 is provided in a region between the two longitudinal grooves 10 of the tread portion 2. The tread groove 11 is constituted by a plurality of grooves each extending in a direction crossing both the tire circumferential direction TC and the tire width direction TW. In other words, the tread groove 11 is provided in a mesh shape. A plurality of blocks 12 are defined by the tread groove 11 and the longitudinal grooves 10 in this region.

Lateral grooves 20 are provided in the tread portion 2 in a region outside the longitudinal grooves 10 in the tire width direction TW. The lateral grooves 20 extend in such directions as to cross the longitudinal grooves 10. In other words, the lateral grooves 20 extend in such directions as to cross the tire circumferential direction TC. The lateral grooves 20 are connected to the longitudinal grooves 10 in such a manner as to communicate with the longitudinal grooves 10. The lateral grooves 20 extend across ground contact ends GE of the pneumatic tire 1 in the tire width direction TW. The lateral grooves 20 may extend in such directions as to cross the tire circumferential direction TC at right angles.

Each of the lateral grooves 20 includes a stone ejector 30 extending in the extension direction of the lateral groove 20. The stone ejector 30 is a protrusion provided on a groove bottom surface of a tire such as an off-road tire to prevent damage to the groove bottom surface caused by a caught stone, and to easily discharge a caught stone to the outside of the groove. The stone ejector 30 is an example of a protrusion according to the present invention.

A plurality of shoulder blocks 40 are defined by the longitudinal grooves 10 and the lateral grooves 20 in a region outside the longitudinal grooves 10 in the tire width direction TW in the tread portion 2 of the pneumatic tire 1.

Figure 3:
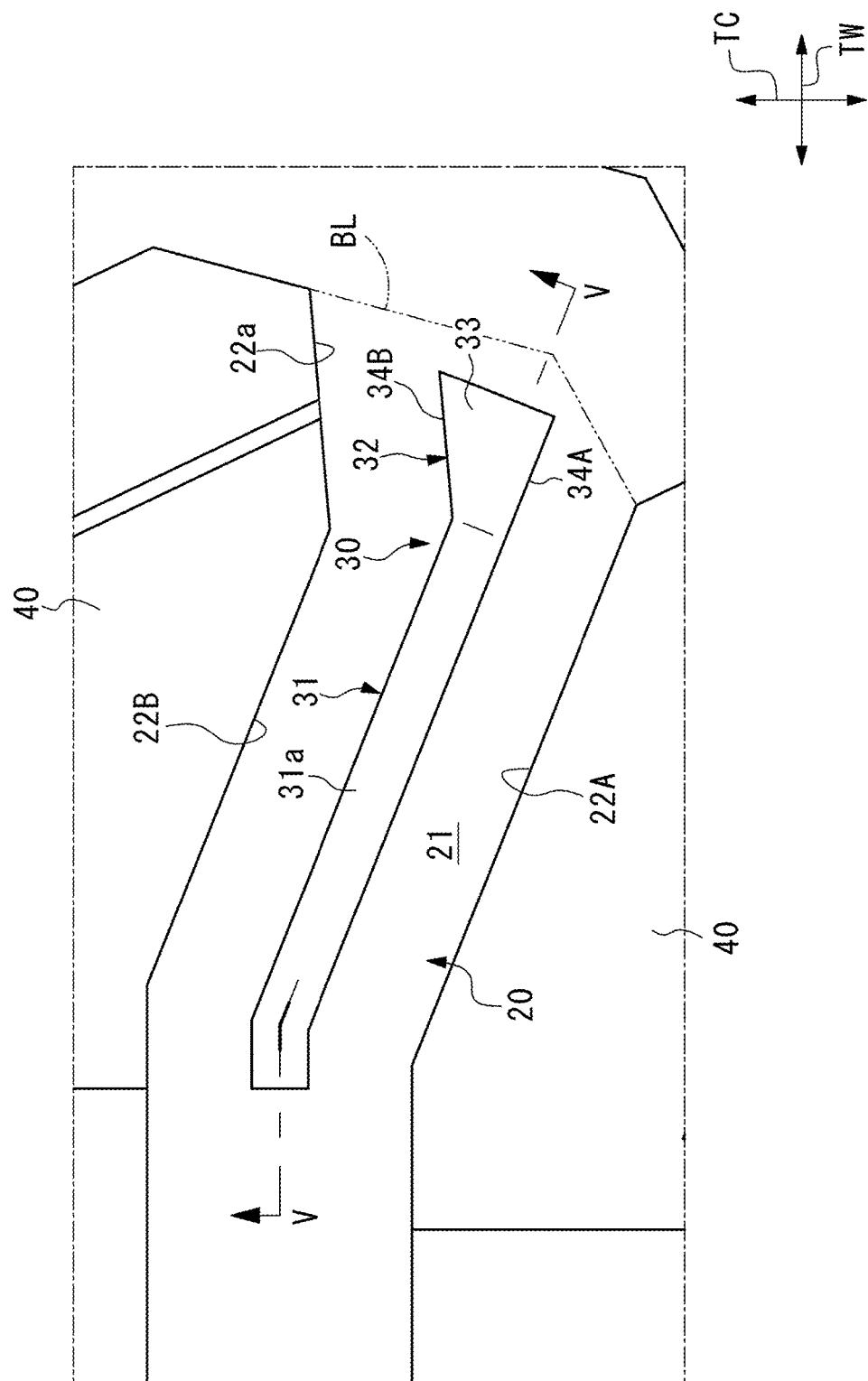
FIG. 3 is a plan view of the tread portion of a pneumatic tire, showing a stone ejector and surroundings according to the first embodiment.
Figure 4:
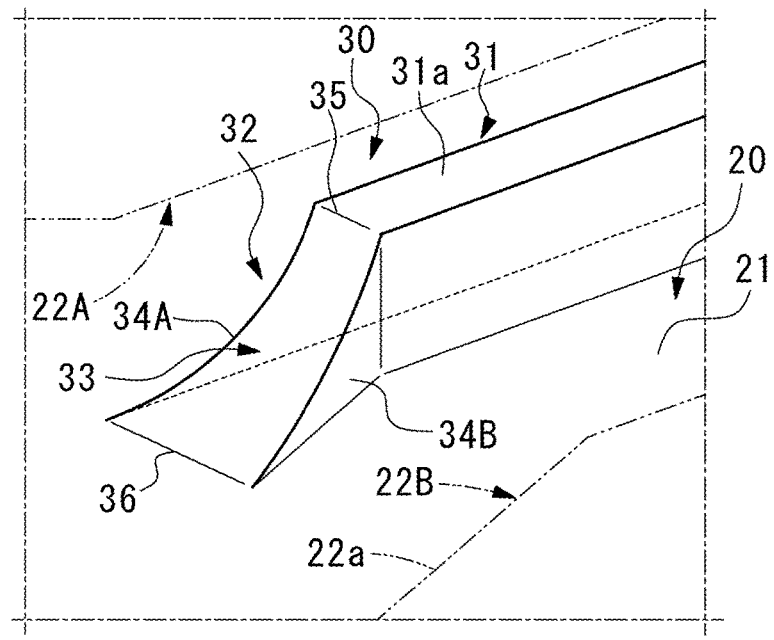
FIG. 4 is a perspective view showing an end portion of the stone ejector and surroundings according to the first embodiment.
Figure 5:
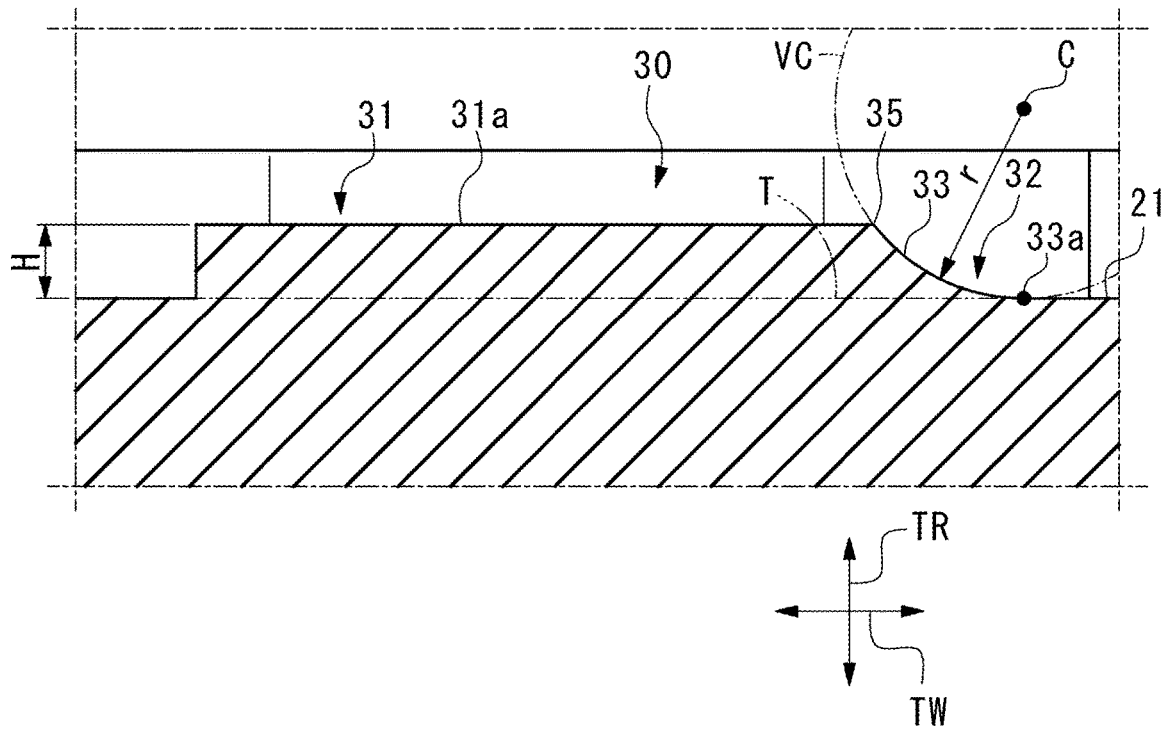
FIG. 5 is a cross-sectional view taken along line V-V in FIG. 3.

FIG. 3 is a plan view of the tread portion 2 of the pneumatic tire 1, showing the stone ejector 30 and surroundings. FIG. 4 is a perspective view showing an end portion 32 (described below) of the stone ejector 30 and surroundings. FIG. 5 is a cross-sectional view taken along line V-V in FIG. 3.

Referring to FIG. 3, the lateral groove 20 includes a groove bottom surface 21 extending in such a direction as to cross the tire circumferential direction TC, and a pair of groove side walls 22A and 22B rising outward in the tire radial direction from both ends of the groove bottom surface 21 in a width direction of the lateral groove 20. In other words, the pair of groove side walls 22A and 22B of the lateral groove 20 are each constituted by a side surface of the shoulder block 40. As described above, the stone ejector 30 is provided on the groove bottom surface 21 of the lateral groove 20.

The lateral groove 20 extends while widening from the outside to the inside in the tire width direction TW. In other words, the lateral groove 20 extends while widening on the longitudinal groove 10 side in the longitudinal direction of the lateral groove 20. The groove side wall 22A on one side in the width direction of the lateral groove 20 (lower side in FIG. 3) extends substantially linearly in the region where the stone ejector 30 is disposed. On the other hand, the groove side wall 22B on the other side in the width direction of the lateral groove 20 (upper side in FIG. 3) includes an inclined portion 22a extending away from the opposing groove side wall 22A from the outside to the inside in the tire width direction TW in the region where the stone ejector 30 is disposed (left side to right side in FIG. 3).

The stone ejector 30 includes a main body 31, and an end portion 32 provided on one side in the longitudinal direction of the main body 31. Specifically, the end portion 32 is provided on the longitudinal groove 10 side in the longitudinal direction of the main body 31.

The main body 31 and the end portion 32 of the stone ejector 30 are disposed inside the lateral groove 20 at positions separated from the pair of groove side walls 22A and 22B of the lateral groove 20. In addition, the stone ejector 30 of the present embodiment is disposed such that the main body 31 does not reach the longitudinal groove 10. The state that the main body 31 does not reach the longitudinal groove 10 herein refers to such a state that the main body 31 does not extend across a virtual boundary line BL between the longitudinal groove 10 and the lateral groove 20. The virtual boundary line BL is a line offset from a groove center of the longitudinal groove 10 by a half of the groove width of the longitudinal groove 10.

Referring to both FIGS. 3 and 4, the main body 31 of the stone ejector 30 has a substantially rectangular parallelepiped shape extending in the extension direction of the lateral groove 20. The main body 31 of the stone ejector 30 has a top surface 31a having a substantially rectangular shape.

The end portion 32 of the stone ejector 30 includes an upper surface 33 having a curved surface shape, and a pair of side surfaces 34A and 34B extending inward in the tire radial direction TR from both ends in the width direction of the upper surface 33.

The end portion 32 of the stone ejector 30 widens from the inside to the outside in the longitudinal direction of the stone ejector 30. Specifically, the end portion 32 of the stone ejector 30 of the present embodiment is formed such that the side surface 34A on one side (lower side in FIG. 3) in the width direction of the stone ejector 30 extends linearly from the main body 31. The side surface 34B on the other side (upper side in FIG. 3) in the width direction of the stone ejector 30 extends along the opposing groove side wall 22B. In other words, the side surface 34B of the end portion 32 of the stone ejector 30 of the present embodiment extends along the inclined portion 22a (indicated by two-dot chain line in FIG. 4) of the groove side wall 22B in a plan view.

Referring to both FIGS. 4 and 5, the end portion 32 of the stone ejector 30 is formed such that a height of the end portion 32 from the groove bottom surface 21 decreases from the inside to the outside in the longitudinal direction of the stone ejector 30. Specifically, as clearly shown in FIG. 5, the upper surface 33 of the end portion 32 of the stone ejector 30 of the present embodiment forms a circular arc recessed inward in the tire radial direction TR in a cross section orthogonal to the width direction of the stone ejector 30.

According to the present embodiment, the upper surface 33 of the end portion 32 of the stone ejector 30 is constituted by a circular arc having a curvature radius r of 20 mm around a center point C located outside in the tire radial direction TR with respect to the upper surface 33 in a cross section shown in FIG. 5. In the present embodiment, the height H of the main body 31 of the stone ejector 30 is 2 mm. In this case, the curvature radius r is preferably 20 mm or more.

As described above, the upper surface 33 of the end portion 32 of the stone ejector 30 has a circular-arc shape recessed inward in the tire radial direction TR in the cross section orthogonal to the width direction of the stone ejector 30. Accordingly, the top surface 31a of the main body 31 and the upper surface 33 of the end portion 32 form a corner 35.

As shown in FIG. 5, the upper surface 33 of the end portion 32 of the stone ejector 30 of the present embodiment is connected to the groove bottom surface 21 in a tangential continuous manner. Specifically, in a cross section shown in FIG. 5, a direction in which a tangent line T of the virtual circle VC including the circular arc forming the upper surface 33 extends at an end point 33a of the upper surface 33 on the groove bottom surface 21 side is aligned with the extension direction of the groove bottom surface 21. As shown in FIG. 4, the end point 33a of the upper surface 33 constitutes a boundary portion 36 between the upper surface 33 and the groove bottom surface 21.

Figure 6:
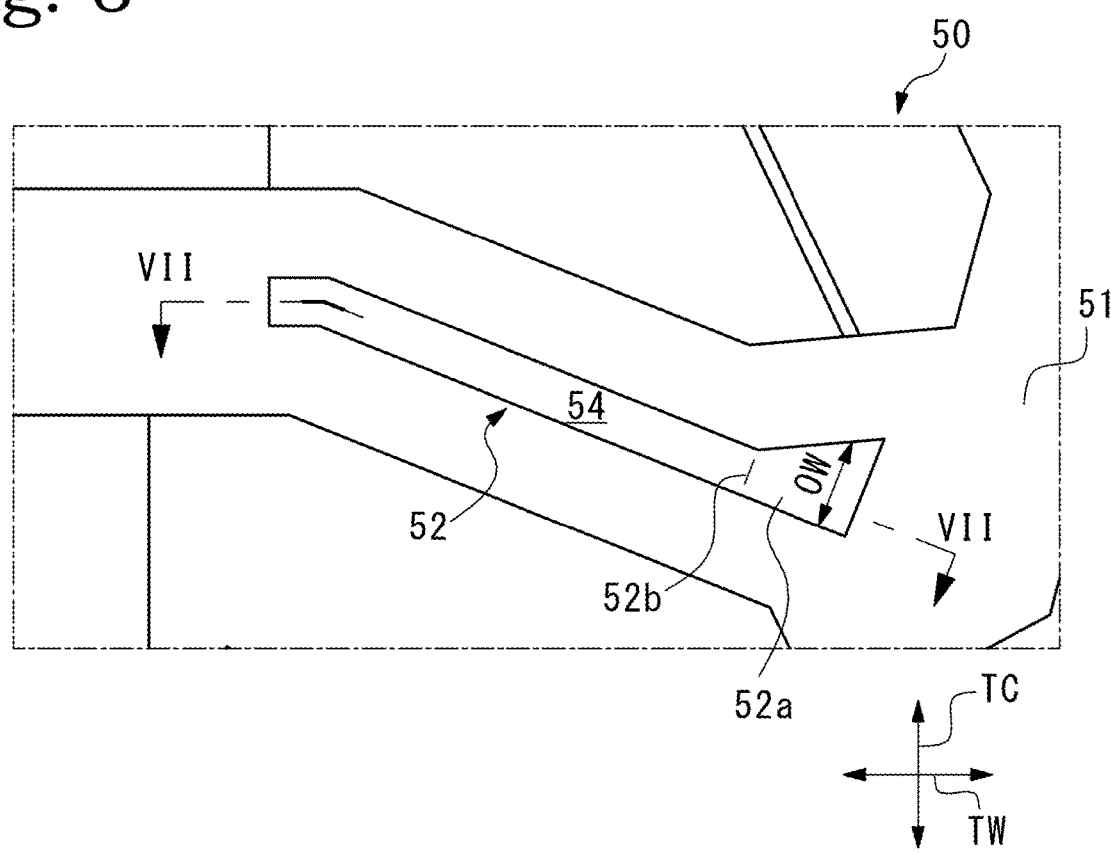
FIG. 6 is a view showing a main part of a molding surface of a mold used for vulcanization molding of the pneumatic tire of the first embodiment.
Figure 7:
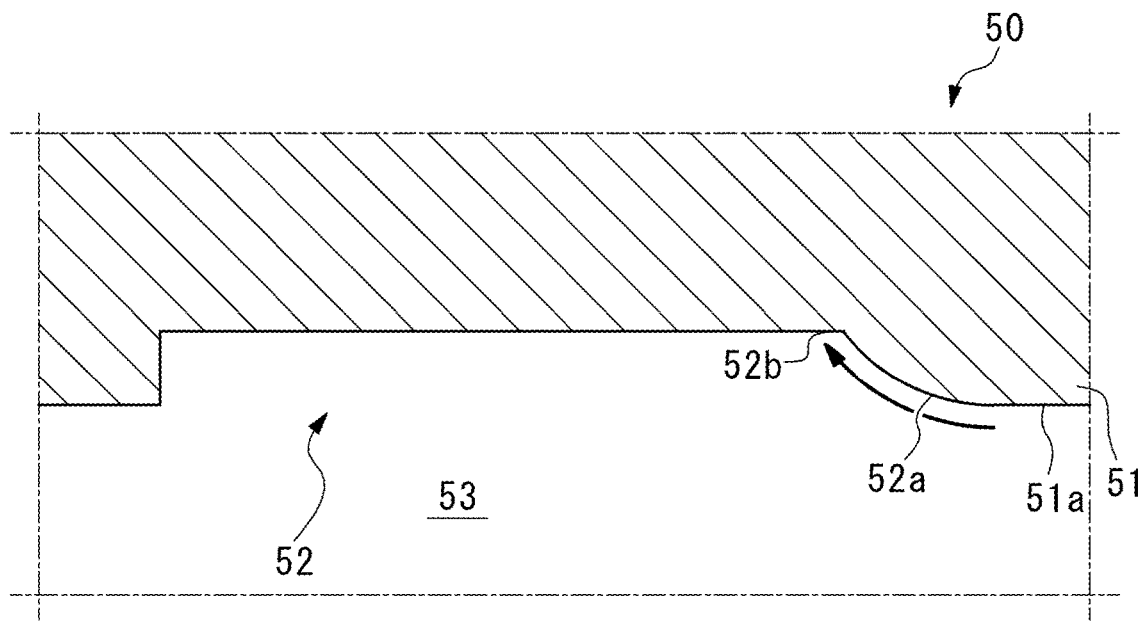
FIG. 7 is a cross-sectional view taken along line VII-VII in FIG. 6.

FIG. 6 is a view showing a main part of a molding surface of a mold 50 used for vulcanization molding of the pneumatic tire 1 of the present embodiment. More specifically, FIG. 6 is a view showing a recess 52 (described below) for molding the stone ejector 30, and surroundings in the molding surface of the mold 50. FIG. 7 is a cross-sectional view taken along line VII-VII in FIG. 6. The stone ejector 30 of the present embodiment is molded by a flow of rubber into the recess 52.

Referring to FIG. 6, the mold 50 of the present embodiment includes a protrusion 51 for molding the longitudinal groove 10 (shown in FIG. 2) and the lateral groove 20 (shown in FIG. 3). The protrusion 51 includes the recess 52 for molding the stone ejector 30. The recess 52 is recessed from a surface of the protrusion 51 to the side opposite to a cavity 53 (shown in FIG. 7). Accordingly, the recess 52 forms an opening 54 in the surface of the protrusion 51.

The recess 52 has a shape corresponding to a shape of the stone ejector 30. Specifically, the recess 52 is shaped such that an opening width OW of the opening 54 expands from the inside to the outside in the longitudinal direction of the recess 52 in correspondence with a shape of the side surface 34B (shown in FIG. 4) of the end portion 32 of the stone ejector 30.

Referring to FIG. 7, a depth of the recess 52 increases from the outside to the inside in the longitudinal direction of the recess 52 in correspondence with a shape of the upper surface 33 of the end portion 32 of the stone ejector 30. The recess 52 has an upper surface molding surface 52a corresponding to the upper surface 33 (shown in FIG. 4) of the end portion 32 of the stone ejector 30. The recess 52 is smoothly connected to a surface 51a of the protrusion 51 in the upper surface molding surface 52a. The recess 52 has a corner 52b corresponding to the corner 35 of the stone ejector 30.

According to this configuration, the upper surface 33 of the end portion 32 of the stone ejector 30 is shaped such that the height of the upper surface 33 from the groove bottom surface 21 decreases toward the outside in the longitudinal direction of the stone ejector 30. Accordingly, the recess 52 of the mold 50 corresponding to the stone ejector 30 becomes deeper from the outside to the inside in the longitudinal direction of the recess 52 in the portion corresponding to the end portion 32 of the stone ejector 30. In this case, rubber is guided along the upper surface molding surface 52a of the recess 52 (see arrow in FIG. 7) during vulcanization molding. Accordingly, the rubber easily flows to a deepest portion of the recess 52 while reducing a defective flow of rubber. Reduction of bareness is thus achievable.

Moreover, according to this configuration, the rubber easily flows to the corner 52b of the recess 52 during the vulcanization molding. In this case, a defective appearance decreases even at the corner 35 where bareness easily occurs. This configuration therefore improves design of a pneumatic tire such as an off-road tire for which three-dimensional design is desired.

According to this configuration, the end portion 32 of the stone ejector 30 widens from the inside to the outside in the longitudinal direction of the stone ejector 30 in the plan view. In this case, the recess 52 of the mold 50 corresponding to the stone ejector 30 has an opening width which increases from the inside to the outside in the longitudinal direction of the stone ejector 30 in the portion corresponding to the end portion 32 of the stone ejector 30. Accordingly, the rubber easily flows to the deepest portion of the recess 52 while reducing a defective flow of rubber during vulcanization molding. Reduction of bareness is thus achievable.

According to this configuration, the end portion 32 is separated from the groove side walls 22A and 22B, and the stone ejector 30 does not block a flow path of the lateral groove 20. Accordingly, sufficient drainage performance of the lateral groove 20 can be obtained.

According to this configuration, the main body of the stone ejector 30 is disposed inside the lateral groove 20, and the main body of the stone ejector 30 does not block the flow path in the longitudinal groove 10. Accordingly, sufficient drainage performance of the longitudinal groove 10 can be obtained.

According to this configuration, the upper surface 33 of the end portion 32 is connected to the groove bottom surface 21 in a tangential continuous manner. Accordingly, the recess 52 of the mold 50 corresponding to the stone ejector 30 is smoothly connected from the surface 51a of the protrusion 51 of the mold 50 in the portion corresponding to the end portion 32 of the stone ejector 30. In this case, rubber is guided along the upper surface molding surface 52a of the recess 52 (see arrow in FIG. 7) during vulcanization molding. Accordingly, the rubber easily flows to the recess 52 while reducing a defective flow of rubber. Reduction of bareness is thus achievable.

Modifications

Figure 8:
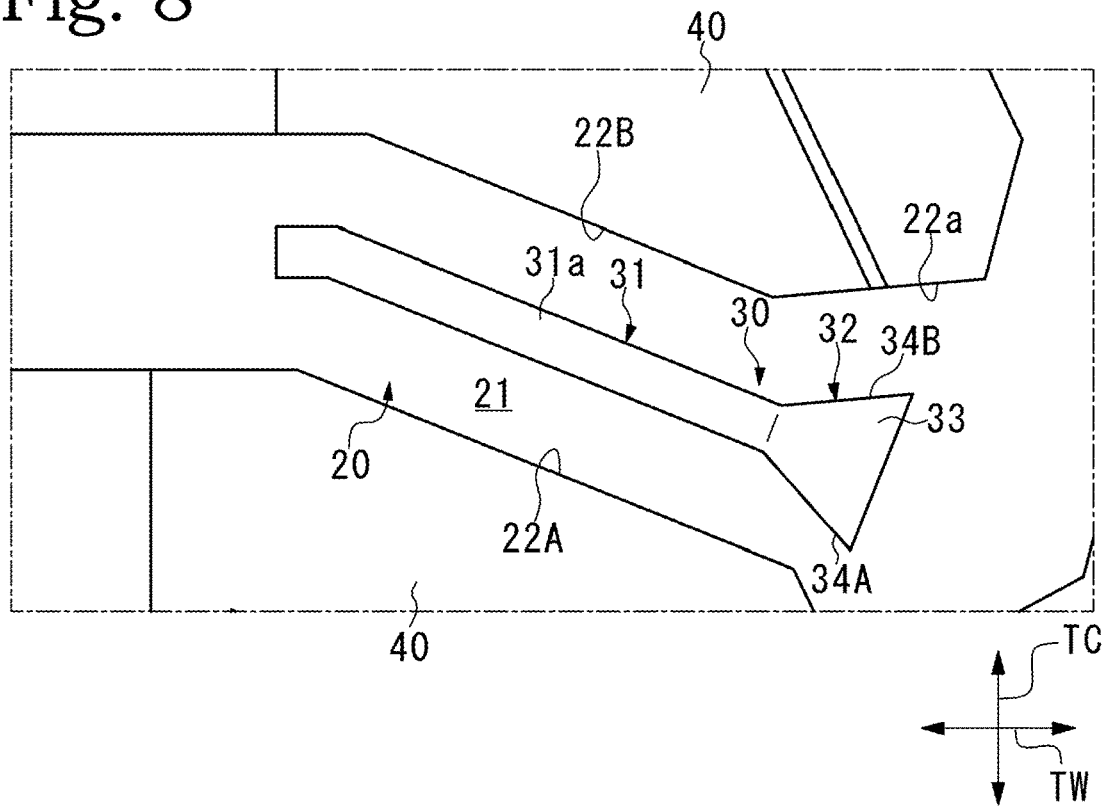
FIG. 8 is a plan view of a tread portion of a pneumatic tire, showing a stone ejector and surroundings according to a modification of the first embodiment.
Figure 9:
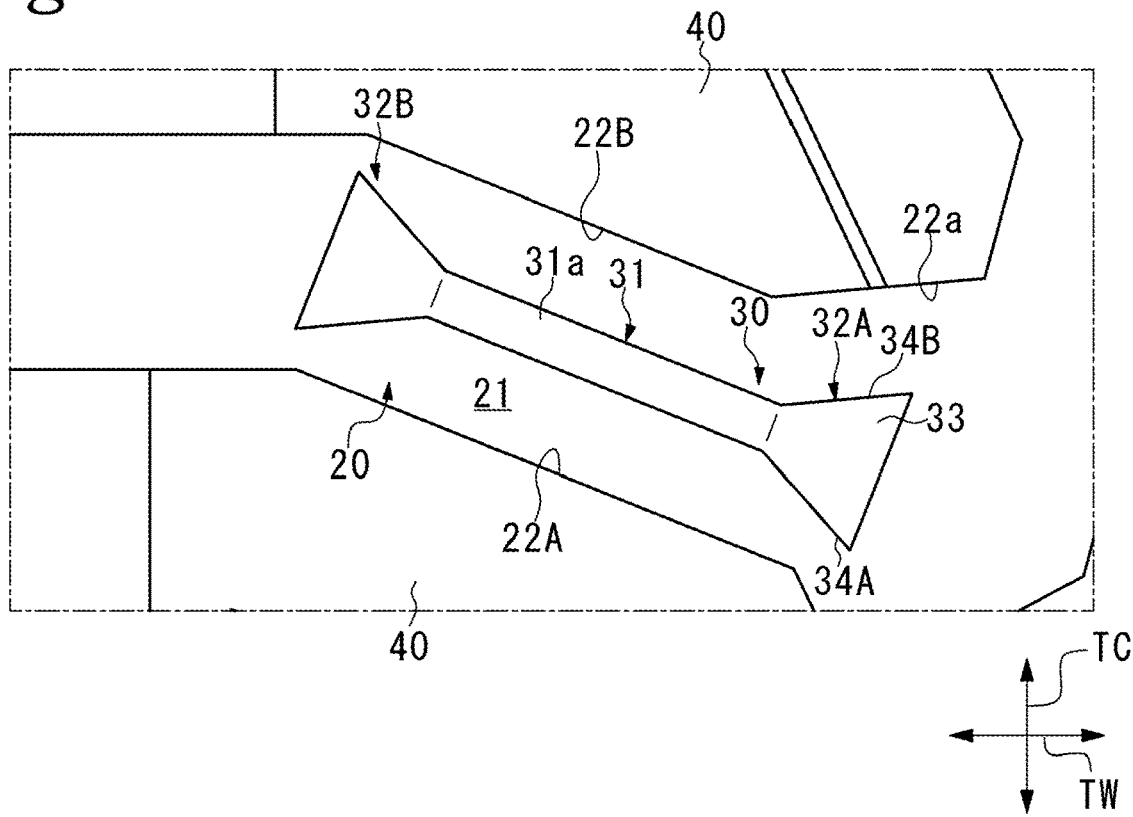
FIG. 9 is a plan view of a tread portion of a pneumatic tire, showing a stone ejector and surroundings according to another modification of the first embodiment.

FIGS. 8 and 9 are plan views of the tread portion 2 of the pneumatic tire 1, showing the stone ejector 30 and surroundings according to modifications of the present embodiment.

In the modification shown in FIG. 8, both the pair of side surfaces 34A and 34B of the end portion 32 of the stone ejector 30 extend from the inside to the outside in the longitudinal direction of the stone ejector 30, while extending from the inside to the outside in the width direction of the stone ejector 30 such that the end portion 32 widens in a plan view.

In the modification shown in FIG. 9, the main body 31 of the stone ejector 30 also includes an end portion 32B on the side opposite to the longitudinal groove 10. The end portion 32B has a configuration similar to the configuration of the end portion 32A provided on the one side (longitudinal groove 10 side) in the longitudinal direction of the stone ejector 30.

Second Embodiment

Figure 10:
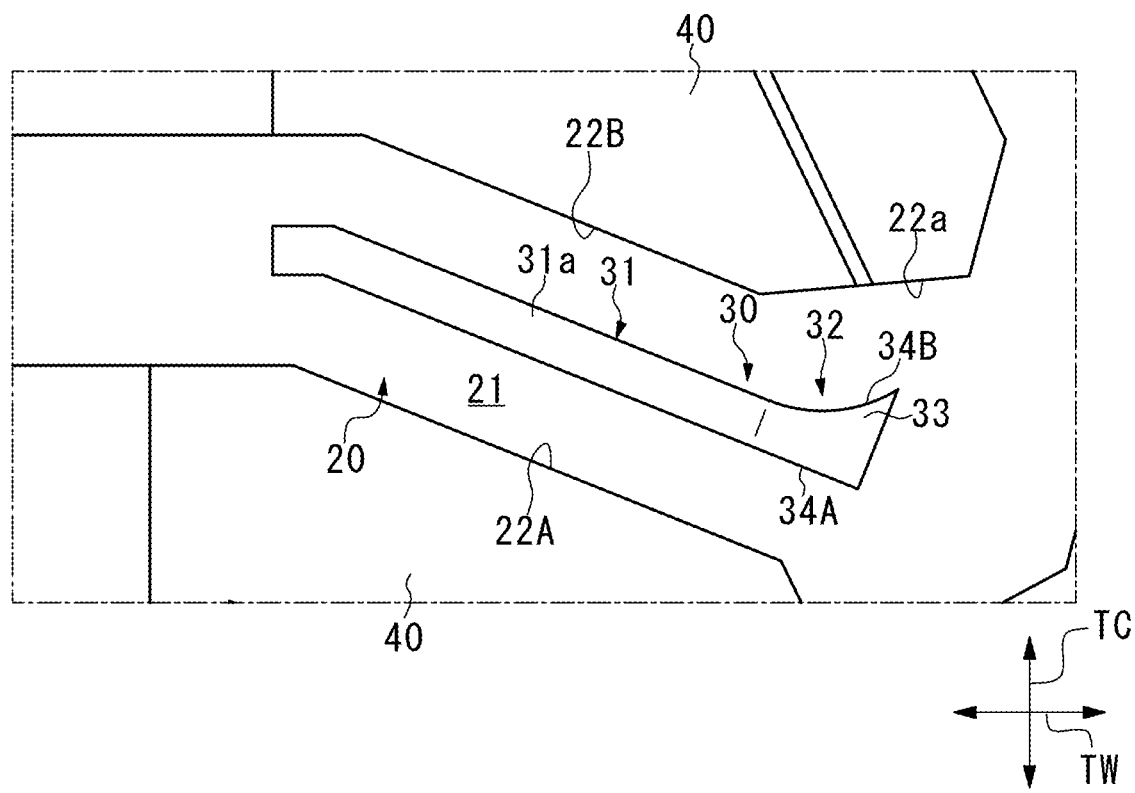
FIG. 10 is a plan view of the tread portion of a pneumatic tire, showing a stone ejector and surroundings according to a second embodiment.

FIG. 10 is a plan view of the tread portion 2 of the pneumatic tire 1, showing the stone ejector 30 and surroundings according to the present embodiment. In a second embodiment, components similar to the components of the first embodiment are provided except for the shape of the end portion 32 of the stone ejector 30. The similar components are given identical reference numerals.

Referring to FIG. 10, the side surface 34B of the end portion 32 of the stone ejector 30 of the present embodiment forms a circular arc recessed inward in the width direction of the stone ejector 30 in a plan view.

According to this configuration, the side surface 34B of the end portion 32 forms the circular arc recessed inward in the width direction of the end portion 32 in the plan view. Accordingly, the recess 52 of the mold 50 corresponding to the stone ejector 30 is shaped such that the opening width OW gradually increases from the inside to the outside in the longitudinal direction of the recess 52 in the portion corresponding to the end portion 32 of the stone ejector 30. Accordingly, the rubber easily flows to the recess 52 while reducing a defective flow of rubber during vulcanization molding. Reduction of bareness is thus achievable.

Although the specific embodiments of the present invention have been described, the present invention is not limited to the above embodiments. Various modifications may be made without departing from the scope of the present invention.

For example, the stone ejector 30 has been described in the first embodiment and the second embodiment as an example of the protrusion of the present invention. However, the protrusion is not limited to this example.

What is claimed is:

1. A pneumatic tire comprising:
    a lateral groove that includes a groove bottom surface extending in a direction crossing a tire circumferential direction;
    a protrusion provided on the groove bottom surface and extending in an extension direction of the groove bottom surface,
    wherein the protrusion includes
    a main body, and
    an end portion provided on at least one side in a longitudinal direction of the main body, and shaped such that a height of the protrusion from the groove bottom surface decreases from an inside to an outside in the longitudinal direction of the main body,
    wherein the end portion includes an upper surface that forms a circular arc recessed inward in a tire radial direction in a cross section crossing a width direction of the protrusion,
    wherein the lateral groove includes a pair of groove side walls that rise outward in the tire radial direction from both ends of the groove bottom surface in the width direction of the groove bottom surface,
    wherein the end portion is separated from the pair of groove side walls in a plan view,
    wherein one groove side wall of the pair of groove side walls includes an inclined portion inclined such that a width of the lateral groove increases from the inside to the outside in a longitudinal direction of the lateral groove in the plan view, and wherein the end portion widens from the inside to the outside in a longitudinal direction of the protrusion in the plan view, and wherein the end portion includes a side surface that forms a circular arc recessed inward in a width direction of the end portion in the plan view, and that is opposed to the inclined portion in the width direction of the groove bottom surface.

2. The pneumatic tire according to claim 1, further comprising a longitudinal groove that extends in the tire circumferential direction and communicates with the lateral groove, wherein the main body of the protrusion does not reach the longitudinal groove.

3. The pneumatic tire according to claim 2, wherein the upper surface of the end portion is connected to the groove bottom surface in a tangential continuous manner.

4. The pneumatic tire according to claim 1, wherein the upper surface of the end portion is connected to the groove bottom surface in a tangential continuous manner.

* * * * *